United States Patent
Kouchi et al.

[11] 4,006,969
[45] Feb. 8, 1977

[54] ELECTRO-CHROMIC DISPLAY DEVICE

[75] Inventors: Akihiko Kouchi; Kunihiro Inoue; Hiroshi Takeshita; Kuniharu Yamada; Tsutomu Otake, all of Suwa, Japan

[73] Assignee: Kabushiki Kaisha Suwa Seikosha, Japan

[22] Filed: Dec. 8, 1975

[21] Appl. No.: 638,579

[30] Foreign Application Priority Data
Dec. 9, 1974 Japan .............. 49-141360

[52] U.S. Cl. ............... 350/160 R; 58/50 R; 58/127 R; 340/324 R; 340/336; 313/519; 313/521

[51] Int. Cl.² ............... G02F 1/23

[58] Field of Search .......... 58/50 R, 127; 350/160 R, 160 LC; 340/336, 324 R; 313/513-521

[56] References Cited
UNITED STATES PATENTS

| | | | |
|---|---|---|---|
| 3,096,271 | 7/1963 | Hespenheide | 350/160 R |
| 3,581,138 | 5/1971 | Hendriks | 313/521 |
| 3,622,224 | 11/1971 | Wysocki et al. | 350/160 R |
| 3,781,863 | 12/1973 | Fujita | 350/160 R |
| 3,839,857 | 10/1974 | Berets et al. | 350/160 R |
| 3,854,794 | 12/1974 | Van Dam et al. | 350/160 R |

*Primary Examiner*—Robert J. Webster
*Attorney, Agent, or Firm*—Blum, Moscovitz, Friedman & Kaplan

[57] ABSTRACT

In an electro-chromic display device having a display field, provision is made for showing a plurality of indicia in the same or overlapping regions, thereby increasing the range of indicia which can be displayed in a given area.

10 Claims, 4 Drawing Figures

ELECTRO-CHROMIC DISPLAY DEVICE

BACKGROUND OF THE INVENTION

In liquid crystal display devices, an essentially planar cell usually has on the inner face of one of the cell walls a plurality of segmented electrodes and a common electrode on the inner surface of the other cell wall where the common electrode is in registry with all of the segmented electrodes on the first surface. Then, whether the liquid crystal is of the field-effect type or of the dynamic scattering mode type, the display is presented by imposing a field which is essentially transverse or perpendicular to the plane of the cell between one or more selected electrodes on one surface and the common electrode on the other surface.

In a carry-over from the liquid crystal display devices, the electro-chromic display devices which depend upon oxidation and reduction of an appropriate material, have also been made in essentially the same construction or arrangement. While such displays have been effective, the extent to which the display can be varied depends upon the arrangement of the segments on one surface. This, of course, limits the range of displays which can be presented. This limitation is unimportant for many applications, but for other types of applications where the range of displays needed is greater, the limitation can be serious. A specific example is the multi-function wristwatch in which it is desired to display hours, minutes, seconds, the day, and the date; it would be desirable to be able to increase the range of indicia which can be presented. Also, it would be desirable to be able to present indicia of different sizes and shapes where the range of sizes and shapes is greater than can be accommodated on the face of one cell wall.

SUMMARY OF THE INVENTION

An electro-chromic display device has at least two opposing plates, the first of which is transparent, and has indicia thereon in the form of transparent electrodes which are selectively connectable to an outside source of voltage. The opposing plate also has on the interior surface thereof segmented electrodes in the form of indicia which are also selectively connectable to an external source of voltage. The indicia may overlap each other, that is, may be in partial registry with each other but, in general, indicia on opposing plates are not simultaneously activated. Between the plates is an electrolyte and the cell also has therein an electrochromic material, either dissolved in the electrolyte or in the form of a deposit upon the indicia. The electrochromic material becomes visible on transfer of electrons. A common electrode which is out of registry with any of the indicia is also provided. This electrode is activated in combination with selected indicia on a selected plate when either display or erasure of a display of specific indicia is desired. For this purpose, the common electrode and the selected indicia on the selected plate must be connectable to the external source of voltage in a polarization direction at the option of the user, depending on whether the objective at the moment is to produce a display or to erase a display.

The electro-chromic material can be a dissolved material such as viologen bromide, or can be a transparent solid material such as tungsten oxide. The rear plate need not be transparent, and conveniently is of a ceramic. The electrodes on the rear plate also need not be transparent and can be of gold.

Three or more plates can be used in sequence, each pair of opposing plates forming a cell with indicia on at least one of the inside surfaces.

Accordingly, an object of the present invention is an electro-chromic display device which can display at least two sets of indicia in a region normally limited to display of only one set of indicia.

Another object of the present invention is an electrochromic display device having a common electrode positioned to one side of the different sets of indicia on each of opposed plates.

A further object of the present invention is an electrochromic display device in which each of opposed plates has a common electrode thereon for the indicia on the same plate.

An important object of the present invention is an electrochromic display device suitable for use in a wristwatch and which can display as many of the time in hours, minutes, seconds, day and date as desired in a limited display region.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

For a fuller understanding of the invention, reference is had to the following description taken in connection with the accompanying drawings, in which:

FIG 3b represents the same wristwatch showing the day and the date in the same display area used for showing the time in FIG. 3a.

DESCRIPTION OF THE PREFERRED EMBODIMENTS

In accordance with the present invention an electrochromic cell to be used in a display device, and, particularly in a wristwatch, comprises opposed plates, the first of which, at least, is transparent. On the interior surfaces of both plates are indicia in the form of electrode segments which are selectively connectable to an external source of voltage. At least the electrodes on the first plate must be transparent.

Figure 1:
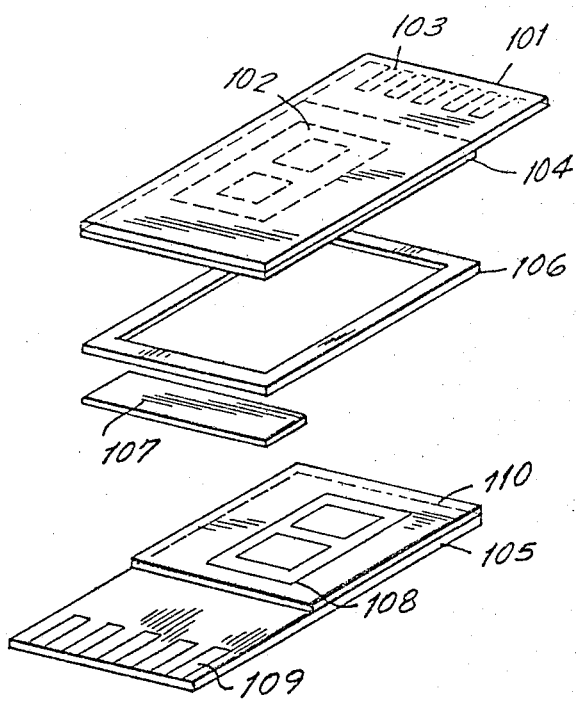
FIG. 1 is an exploded view in perspective of an electrochromic display device in accordance with the present invention wherein there is one common electrode for use with both opposing plates.

An embodiment of the invention is shown in FIG. 1. A sample display electrode pattern 102 in the form of a FIG. 8 is shown on the inner surface of front glass plate 101. This display pattern is normally segmented in the well-known 7-segment array, each array being connected by conductive leads (not shown) to individual contact tabs 103, also on the inner surface of plate 101. In the embodiment shown in FIG. 1, tungsten oxide in the form of a film 104 covers the display electrode pattern 102 and adheres to the display pattern and to the glass plate.

The display cell is formed by rear plate 105 and spacer 106 which is an insulator. A common electrode 107 is placed between tungsten oxide film 104 and back plate 105. Conveniently, the common electrode 107 protrudes for a short distance beyond spacer 106 so that electrical contact can be made thereto. A convenient material for common electrode 107 is lead or carbon. Rear plate 105 also has a display electrode pattern 108 thereon which usually is segmented. The plate further has thereon conductive leads (not shown) connecting the segments of the display pattern with conductive tabs 109 formed on rear plate 105. Again, a tungsten oxide film 110 covers the display electrode pattern 108. The electrolyte is sulphuric acid or any other convenient conductive solution which is encapsulated in the cell formed by the front and rear plates and the spacer.

Figure 2:
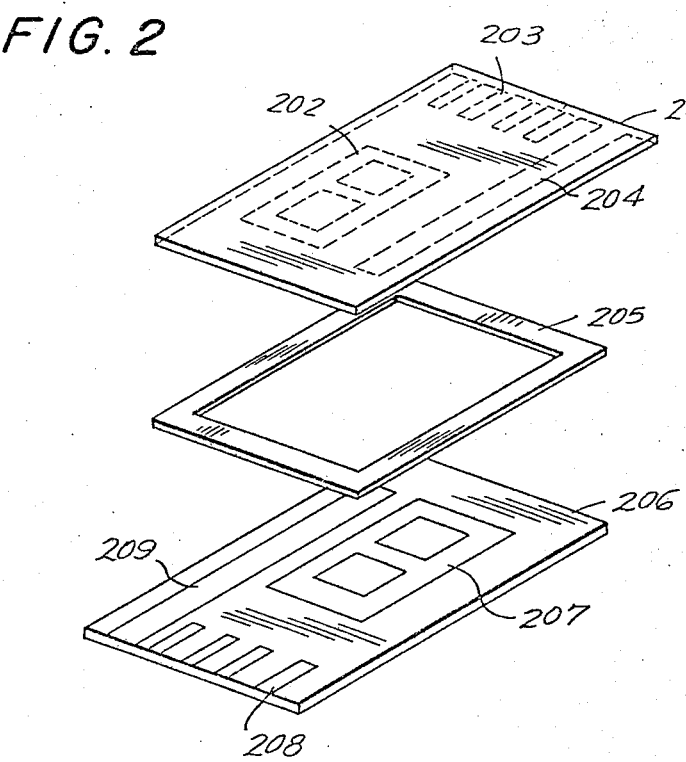
FIG. 2 is another embodiment of the invention in which there is a separate common electrode for each of the opposed plates.

Rear plate 105 need not be of glass nor need it be transparent. As shown in FIG. 2 which represents an electrochromic display device based on an organic material, the organic material is viologen bromide dissolved in water. In this case a display electrode 202 which also is segmented is connected through conductive leads which are not shown to conductive tabs 203. Furthermore, on the inner surface of plate 201 is a common or reference electrode 204. Preferably reference electrode 204 is positioned so that it is outside the field of view presented by the display device of which the cell constitutes the operative portion. The cell also has a back plate 206 separated from front plate 201 by spacer 205. A convenient and suitable material for the back plate is alumina.

The back plate also has on the inner surface thereof a display 207, the segments of which are connected by conductive leads (not shown) to conductive tabs 208. Also on the rear plate is a reference or common electrode 209. Conveniently, display electrode 207 and reference electrode 209 are formed by deposited films of gold on the surface of alumina base plate 206. A water solution of viologen bromide is encapsulated in the cell which is constituted of the two base plates and the spacer.

As is evident, reference electrode 204 can be used for actuating selected segments of segmented display 202 by applying voltage in the proper direction through conductive leads and tabs 203. Similarly, selected segments of display electrode 207 can be activated by applying a voltage between selected segments and reference or common electrode 209. Regardless of whether the display uses tungsten oxide or a solution of viologen bromide, or any other electro-chromic compound, the display is actuated when the segmented electrode is reduced, in other words, made negative with respect to the common electrode or to the reference electrode. As is evident, by the use of the common electrode as shown in FIG. 1 or either of the common or reference electrodes shown in FIG. 2, selected displays on a selected plate can be shown. The display, of course, has a memory since once the active compound is converted over into the reduced form it stays in this form until the voltage is reversed. Naturally, current must flow so that there will be transfer of a sufficient number of electrons to make the display evident. The important point is that a plurality of displays can be shown in the same area normally occupied by a single display as in liquid crystal display devices.

Figure 3A:
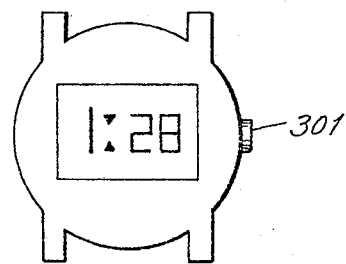
FIG. 3a represents a wristwatch showing the time.
Figure 3B:
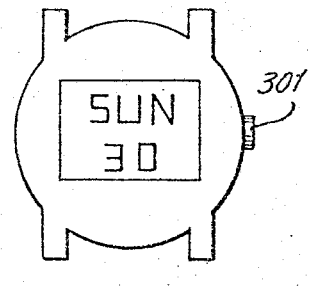

The way in which different displays can be shown in the same region is made evident in FIGS. 3a and 3b. In FIG. 3a hours and minutes are displayed on the front plate. In FIG. 3b, the day of the week and the date are displayed on the back base plate. Selection of activation of either the front plate or the back plate is made by means of switch 301. Switch 301 can be devised according to known means so that its operation is 4-fold. Thus, it can activate either the front or the back plate, or it can erase either the front or the back plate.

As aforenoted, the reference or common electrode is placed to one side of the display so that it is in registry with no part of any of the segments. As a result, the flow of current is essentially in the plane of the cell. This, of course, is directly opposite to what occurs in the liquid crystal cell of the dynamic scattering mode type, where the flow of current is transverse or perpendicular to the plane of the cell.

Tungsten oxide is an example of an inorganic material which may be used for electro-chromic devices. When made negative in accordance with the present invention, the display formed is blue in color. On the other hand, where viologen bromide is used, a red-violet insoluble thin film separates out on the display electrode when it is made negative. As a result, the contrast of this type of display is high and the display continues until a reversed voltage is applied in order to erase same. Consequently, there is a memory effect.

Further coloration can be supplied by making the rear plate of any desired color.

It should also be noted that the voltage necessary for activating the display is low and the consumption of current during display, again, is low. This is particularly important in that where desired, the display can be allowed to remain in view without consumption of current, once the color is formed.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An electro-chromic display device, comprising first and second opposed plates, at least said first plate being transparent, electrodes in the form of indicia on the inner surface of each of said opposed plate, the electrode on at least said first plate being transparent, a transparent electrolyte disposed between said plates, a common electrode, an electro-chromic material making contact with said indicia on each of said plates and said common electrode, said common electrode and said indicia on each plate being selectively connectable to an external source of voltage in a selected polarization direction, said common electrode and said indicia forming electrodes being so positioned in non-registry with each other for selectively actuating the indicia on either plate for display so that two sets of indicia may be available in the space normally available for only one set.

2. The device as claimed in claim 1, wherein said electrolyte is aqueous and said electro-chromic material is viologen bromide.

3. The device as claimed in claim 1, wherein said electrolyte is an acid and said electro-chromic material is tungsten oxide.

4. The device as claimed in claim 1, wherein said common electrode is of a member of the group consisting of lead and carbon.

5. The device as claimed in claim 1, wherein said display device includes a common electrode on each plate, each common electrode being actuated in conjunction with the indicia on the same plate.

6. The device as claimed in claim 5, wherein each common electrode is disposed outside the display area of said device.

7. The device as claimed in claim 1, wherein said second plate is of a ceramic.

8. The device as claimed in claim 7, wherein said indicia on said ceramic plate are of gold.

9. The device as claimed in claim 1, wherein said indicia are of a member selected from the group consisting of $SnO_2$ and $InO_2$.

10. The device as claimed in claim 1, wherein said second plate is colored.

* * * * *